US008520906B1

(12) United States Patent
Moon et al.

(10) Patent No.: US 8,520,906 B1
(45) Date of Patent: Aug. 27, 2013

(54) METHOD AND SYSTEM FOR AGE ESTIMATION BASED ON RELATIVE AGES OF PAIRWISE FACIAL IMAGES OF PEOPLE

(75) Inventors: Hankyu Moon, State College, PA (US); Rajeev Sharma, State College, PA (US); Namsoon Jung, State College, PA (US)

(73) Assignee: VideoMining Corporation, State College, PA (US)

( * ) Notice: Subject to any disclaimer, the term of this patent is extended or adjusted under 35 U.S.C. 154(b) by 1164 days.

(21) Appl. No.: 12/283,595

(22) Filed: Sep. 12, 2008

Related U.S. Application Data

(60) Provisional application No. 60/994,985, filed on Sep. 24, 2007.

(51) Int. Cl.
*G06K 9/00* (2006.01)
*G06K 9/46* (2006.01)
*G06K 9/66* (2006.01)
*G06K 9/62* (2006.01)

(52) U.S. Cl.
USPC ............ 382/118; 382/190; 382/224; 382/225

(58) Field of Classification Search
USPC .................................................. 382/115–118
See application file for complete search history.

(56) References Cited

U.S. PATENT DOCUMENTS

| | | | |
|---|---|---|---|
| 5,537,488 A | 7/1996 | Menon et al. | |
| 5,781,650 A | 7/1998 | Lobo et al. | |
| 6,453,246 B1 | 9/2002 | Agrafiotis et al. | |
| 6,990,217 B1 | 1/2006 | Moghaddam et al. | |
| 2002/0169730 A1 | 11/2002 | Lazaridis | |
| 2003/0088832 A1* | 5/2003 | Agostinelli et al. | 715/526 |
| 2003/0210808 A1 | 11/2003 | Chen et al. | |

OTHER PUBLICATIONS

Das et al., "Automatic face-based image grouping for albuming," Oct. 5 2003, Systems, Man and Cybernetics, 2003, vol. 4, pp. 3726-3731.*
Lanitis et al., "Comparing different classifiers for automatic age estimation," Fen. 2004, Systems, Man and Cybernetics, part B, vol. 34, issue 1, pp. 621-628.*
U.S. Appl. No. 11/811,614, Moon, et al.
U.S. Appl. No. 60/874,585, Jung, et al.

* cited by examiner

*Primary Examiner* — Amir Alavi
*Assistant Examiner* — Kenny Cese

(57) ABSTRACT

The present invention is a system and method for estimating the age of people based on their facial images. It addresses the difficulty of annotating the age of a person from facial image by utilizing relative age (such as older than, or younger than) and face-based class similarity (gender, ethnicity or appearance-based cluster) of sampled pair-wise facial images. It involves a unique method for the pair-wise face training and a learning machine (or multiple learning machines) which output the relative age along with the face-based class similarity, of the pairwise facial images. At the testing stage, the given input face image is paired with some number of reference images to be fed to the trained machines. The age of the input face is determined by comparing the estimated relative ages of the pairwise facial images to the ages of reference face images. Because age comparison is more meaningful when the pair belongs to the same demographics category (such as gender and ethnicity) or when the pair has similar appearance, the estimated relative ages are weighted according to the face-based class similarity score between the reference face and the input face.

12 Claims, 12 Drawing Sheets

METHOD AND SYSTEM FOR AGE ESTIMATION BASED ON RELATIVE AGES OF PAIRWISE FACIAL IMAGES OF PEOPLE

CROSS-REFERENCE TO RELATED APPLICATIONS

This application claims the benefit of U.S. Provisional Patent Application No. 60/994,985, filed Sep. 24, 2007.

FEDERALLY SPONSORED RESEARCH

Not Applicable

SEQUENCE LISTING OR PROGRAM

Not Applicable

BACKGROUND OF THE INVENTION

Field of the Invention

The present invention is a system and method for an automatic age estimation based on the computer processing of facial image of people using the notion of pair-wise facial image and relative age.

BACKGROUND OF THE INVENTION

It is not an easy task to estimate the age of a person solely from his/her facial appearance. The notion of physical age of people is well defined, and there is some general way of a person's facial appearance is affected by age. However, there is a great deal of ambiguity in the recognition of age by facial appearance, and the recognition is also subjective and error-prone.

The age recognition can be solved by fundamentally the same approach typically used in face recognition: the supervised learning technique. To train a supervised learning machine to recognize age, it is necessary to have a training set of facial images along with annotated ages. However, it is hard to have a face dataset with a reliable age annotation. Because of the age-appearance ambiguity, the human annotator will make subjective judgment of the age based on his/her experience. As a result, the trained classifier will attain the same degree of ambiguity.

The main idea behind the present method is that it is much easier to judge whether one person is older than the other than to determine individual age. It is also much easier to judge whether two people belong to the same age group or not than to estimate actual ages. The determined 'relative age' is also more accurate and meaningful when the pair belongs to the same demographics group or when their facial appearance is similar.

Based on these observations, we train learning machines to estimate the relative age of a pair of images and the facial similarity (in terms of the face-based class membership) between the images in the pairs. We call the pair a 'pairwise facial image', and regard it as a single data entity. Manual annotation is performed on the pairwise facial images to determine the relative ages; the pairwise facial images along with the relative ages comprise the training data. Given an input query facial image, it is paired with a number of reference facial images, whose ages are known, to form pairwise facial images. These images are fed to the trained learning machine(s) to estimate the relative ages between the input face and the reference faces. The age of the input face is estimated based on these comparisons to the reference faces (the relative ages).

There have been prior attempts for doing demographics classification based on facial images of people.

In U.S. Pat. No. 5,781,650 of Lobo, et al. (hereinafter Lobo), the problem of age classification is handled by focusing on local features that are relevant to aging. The approach is both local feature based and also per-image classification. While Lobo aims to solve the same problem as the present invention do, the approach is vastly different. The proposed invention makes use of holistic image feature, and compares the pair of facial images to estimate the relative age.

U.S. Pat. No. 6,990,217 of Moghaddam, et al. (hereinafter Moghaddam) proposes to employ SVM to find the optimal separating hyperplane in feature space to solve the gender recognition problem. This is a typical approach to solve the demographics recognition problem, by estimating the direct relation from facial images to demographics labels (such as male, female, etc). While the age estimation problem can be solved in the same manner, the success of the approach still depends on the reliability of the provided age labels of the training data. The proposed invention solves the issue by using an implicit relation among the data—relative age measure, which is more accurate and reliable. Unlike Moghaddam, the proposed invention also makes use of other class information; it proposes the use of other face-based class information (such as demographics classes or appearance-based clusters) to make the age estimation problem more specialized. In U.S. Pat. No. 7,848,548 of Moon, et al. (hereinafter Moon), a comprehensive approach to perform demographics classification from tracked facial images has been introduced. The method to carry out the demographics classification, including the age classification, also utilizes conventional machine learning approach to find a mapping from the facial image data to the class labels. The present invention introduces a notion of the relative age of a pairwise image, where similar machine learning approach is used to find the mapping from the pairwise facial image to the relations, instead of the mapping from the set of single images to the set of labels.

There have been prior attempts for utilizing the pairwise relation among data to represent the structure in data, more specifically, for the purpose of clustering or classifying data.

Learning Visual Similarity Measures for Comparing Never Seen Objects, IEEE Conference on Computer Vision & Pattern Recognition 2007, of Nowak and Jurie (hereinafter Nowak) handles the problem of object recognition by using pairwise local feature similarity measure. While the fundamental ideas of the method—of using the relative measure of visual similarity—is shared by the proposed invention, Nowak mainly concerns the problem of generic object recognition, not the age estimation. Their use of local feature comparison is very different from the holistic facial image pair learning of the disclosed invention; the proposed invention aims to solve the age estimation by employing the pairwise annotation and training. Enhancing Image and Video Retrieval: Learning via Equivalence Constraints, IEEE Conference on Computer Vision & Pattern Recognition 2003, of Hertz, Shental, Bar-Hillel, and Weinshall (hereinafter Hertz) introduces a framework using the equivalence relation among data for the processing of visual data. The method is used to handle clustering and classification of facial or video data. While the method shares the same principle of exploiting the relation among data, the present invention specifically makes use of the age order information between facial images; while it is hard to determine actual ages by facial appearance, it is much easier and more reliable to determine which face is older/younger between the two. The present invention employs pairwise training for actual classification. Except for the shared fundamental concept, the method is very different from the disclosed invention in terms of application and method of classification. U.S. Pat. No. 6,453,246 of Agrafiotis, et al. (hereinafter Agrafiotis) introduces a method to build or refine data representation in multi-dimensional space from random, partial, or human observed pairwise relation among data points. The method also shares a common principle (of using pairwise relation) with the present invention; However, Agrafiotis proposes a way to represent and clean up data using any available observation of pairwise relations while the present invention proposes a way to exploit the observable pairwise relation to estimate ages from facial image data.

There have been prior attempts for finding class information of data by utilizing another class information or the data attributes in another dimension.

The present invention employs a class determination method similar to U.S. Pat. No. 5,537,488 of Menon, et al. (hereinafter Menon) for using the face-based class similarity score. However, the present invention simply utilizes the class-determination to weight the relative age between a pair of faces according to the confidence level. U.S. Pat. Pub. No. 20020169730 of Lazaridis (hereinafter Lazaridis) proposed approaches to identifying one or more latent classes among data by utilizing the class information or data attributes in another dimension. To extract more reliable relative age information (class information or in another dimension), the present invention makes use of the class similarity score (class information or data characteristics in another dimension). The present invention shares its very broad framework with Lazaridis; it proposes a novel approach to utilize the relation among the data to combine the class information to extract age information, using the fact that the age comparison is more meaningful within the same class. U.S. Pat. Pub. No. 20030210808 of Chen, et al. (hereinafter Chen) introduced a facial image clustering method where the clustering is based on the similarity score from face recognizer. The present invention utilizes one of such methods to compute the similarity score, to weight the relative age estimation; however, the notion of similarity score in the present invention is broader than this particular method. It can be continuous similarity scores, or class memberships.

In summary, while there have been prior attempts to solve the problem of age estimation (or, more general demographics classification), to find structure in data by utilizing the pairwise relation, and to find the structure of data in one dimension by exploiting the feature in another dimension, the present invention proposes a novel comprehensive approach to solve the problem of age estimation. It utilizes the age relation (relative age) between the pair of facial images (pairwise facial image), and the ease of annotating the age relation. It also employs the pairwise facial image training to find the mapping from the pairwise data to the set of relations. Other facial class information (face-based class similarity) is also used to achieve more reliable age estimation.

SUMMARY

The present invention is a method and system for estimating people's ages based on their facial images, where learning machines are trained to output the relative age and face-based class similarity of a pairwise facial image.

It is one of the objectives of the first step of the processing to sample pairs of faces from the face database and annotate the relative ages and face-based class similarities, and to select reference faces from the face database, to generate a training data of pairwise facial images.

Due to the large number of possible pairs of images, a subset of such pairs is randomly sampled from the face database. The samples are drawn with replacement and with the same (uniform) probability. The samples should reflect the diversity that would be seen in real operating environment.

Once the samples of pairs of facial images are drawn, they are manually annotated by a human annotator. For a given pair of images, two labels are determined: the relative age and the face-based class similarity. The relative age is determined from a predetermined set of labels that represent whether the first face is older or younger and by how much. The final annotated relative age label should belong to a predetermined set of numeric values.

A set of reference faces is chosen according to two criteria: 1. The set have balanced numbers of faces from each demographics category or from each face clusters. 2. The faces have either annotated numeric ages (such as 34 years old, 18 years old, etc.) with high confidence, or ground truth ages.

In one of the exemplary embodiments, the relative age can be labeled among 'younger than', 'the same age', 'older than'. The corresponding numeric values can be −1, 0, and 1.

In one of the exemplary embodiments, the relative age can be labeled among 'significantly younger', 'somewhat younger', 'about the same age', 'somewhat older', 'significantly older'. The corresponding numeric values can be −2, −1, 0, 1, 2.

The face-based class similarity score represents whether the two faces in the pairwise facial image belong to one of the predetermined classes of faces. When they belong to the same class, the face-based class similarity score is 1, and 0 otherwise.

In one of the exemplary embodiments, the face-based class similarity score is determined by the membership to the predetermined demographics groups: male African, female African, male Caucasian, female Caucasian, male Hispanic, female Hispanic, male Oriental, female Oriental.

In one of the exemplary embodiments, the face-based similarity score is determined by the membership to the predetermined appearance-based face clusters. The clusters are determined by an automatic clustering algorithm based on the facial appearance.

It is one of the objectives of the second step of the processing to train a learning machine or multiple learning machines, so that given a pairwise facial images, the training machine(s) output the relative ages, or, both the relative age and the face-based class similarity score.

A neural network or Support Vector Machine can be used as exemplary embodiments.

In one of the exemplary embodiments, a single machine is used to estimate both the relative age and the face-based class similarity score.

In one of the exemplary embodiments, multiple machines are employed where each machine is specialized to a certain face-based class. In this case, the training should be 'asymmetric'; the training faces that belong to the category, say C, will be paired with general training faces (both from the category C and from other categories) so that the learning machine for the category C will be trained to output both the relative age between the faces and the category C membership (belong: 1, or do not belong: 0).

It is one of the objectives of the third step of the processing to compute the relative ages and the face-based class similarity scores of the pairwise facial images, to measure the age and class difference between a given input face and the reference faces. At testing stage, a given input image is paired with multiple reference faces that were used for training, and the resulting pairwise facial images are fed to the trained learning machines to estimate the relative ages and the face-based class similarity scores.

It is one of the objectives of the fourth step of the processing to estimate the age of the input face, by using the facial similarity weighted voting.

The relative age outputs of the given input face against the reference faces are aggregated to finally estimate the age of the input face. The face-based class similarity scores between the pair are used to weight the relative age.

In one of the exemplary embodiments, the facial similarity weighted voting is carried out by the following steps:
1. Given a reference face (the first image of the pairwise facial image), the range of age is divided into a number of intervals according to the partition of relative labels
2. Input face X is paired with N faces (F_1, C_1, A_1), (F_N, C_N, A_N), where F, C, and A denote face, face-based class label, and relative age label.
3. The pairs (X, F_1), (X,F_N) are fed to the machine(s) and are assigned relative age and face-based class similarity scores: (O_1, S_1), . . . ,(O_N, S_N).
4. For each reference face F_I, the estimated relative age (of X relative to F_I) cast vote to the age intervals as partitioned in (i), with a voting weight given by the face-based class similarity score S_I
5. The sum of all votes determines the age of the given input face X

DRAWINGS

Figures

DETAILED DESCRIPTION OF THE INVENTION

Figure 1:
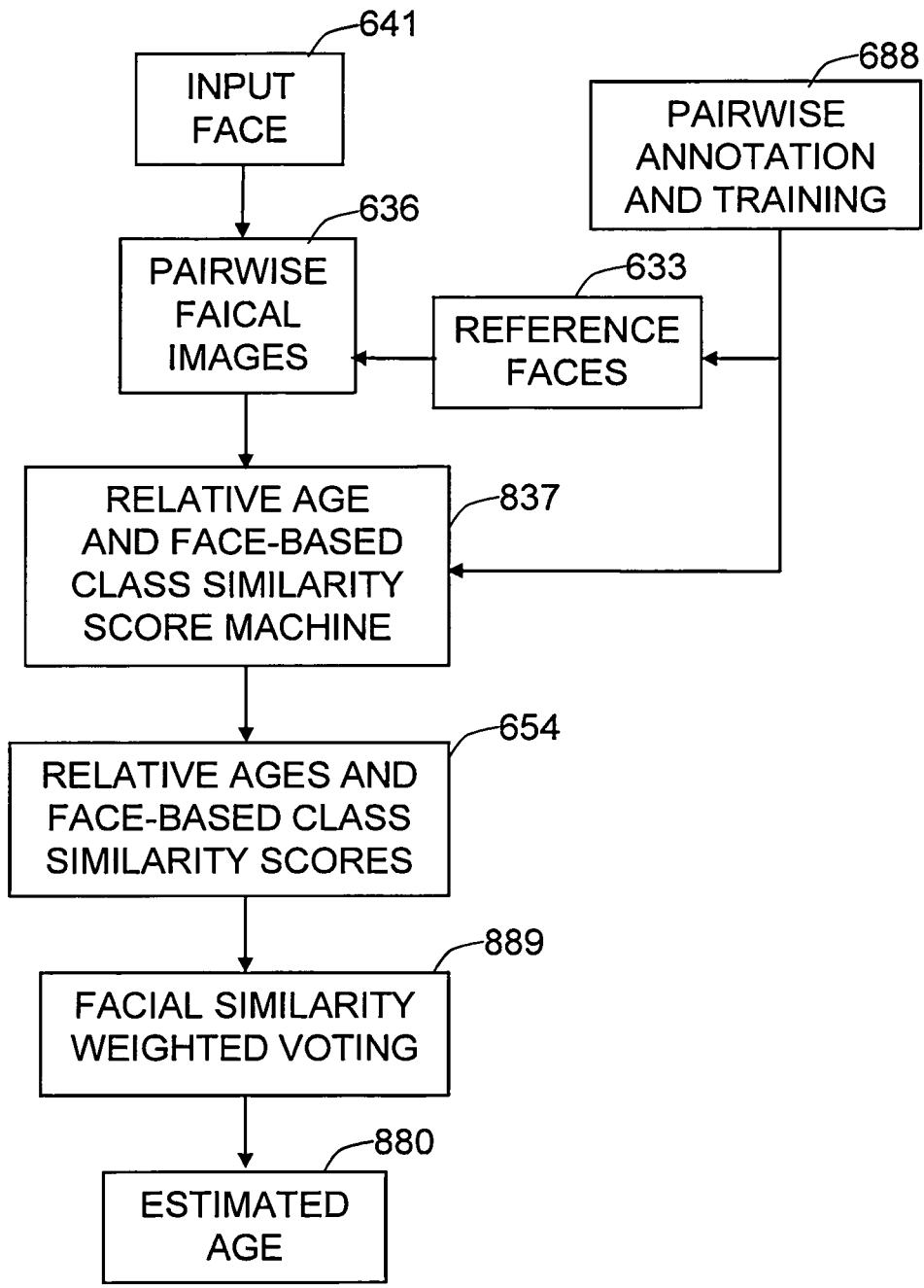
FIG. 1 is an overall view of the preferred embodiment of the invention.

A preferred embodiment of the present invention is illustrated in FIG. 1. The pairwise annotation and training 688 step generates both the reference faces 633 and the relative age and face-based class similarity score machine 837.

Given an input face 641 with unknown age and unknown face-based class, it is paired and attached side-by-side with the reference faces 633 to form pairwise facial images 636. The pairs are fed to the relative age and face-based class similarity score machine 837 one by one to estimate the relative ages and the face-based class similarity scores 654 between the faces in the pairs. The relative ages and the face-based class similarity scores 654 are processed by the facial similarity weighted voting 889 to finally generate the estimated age 880 of the input face 641.

Figure 2:
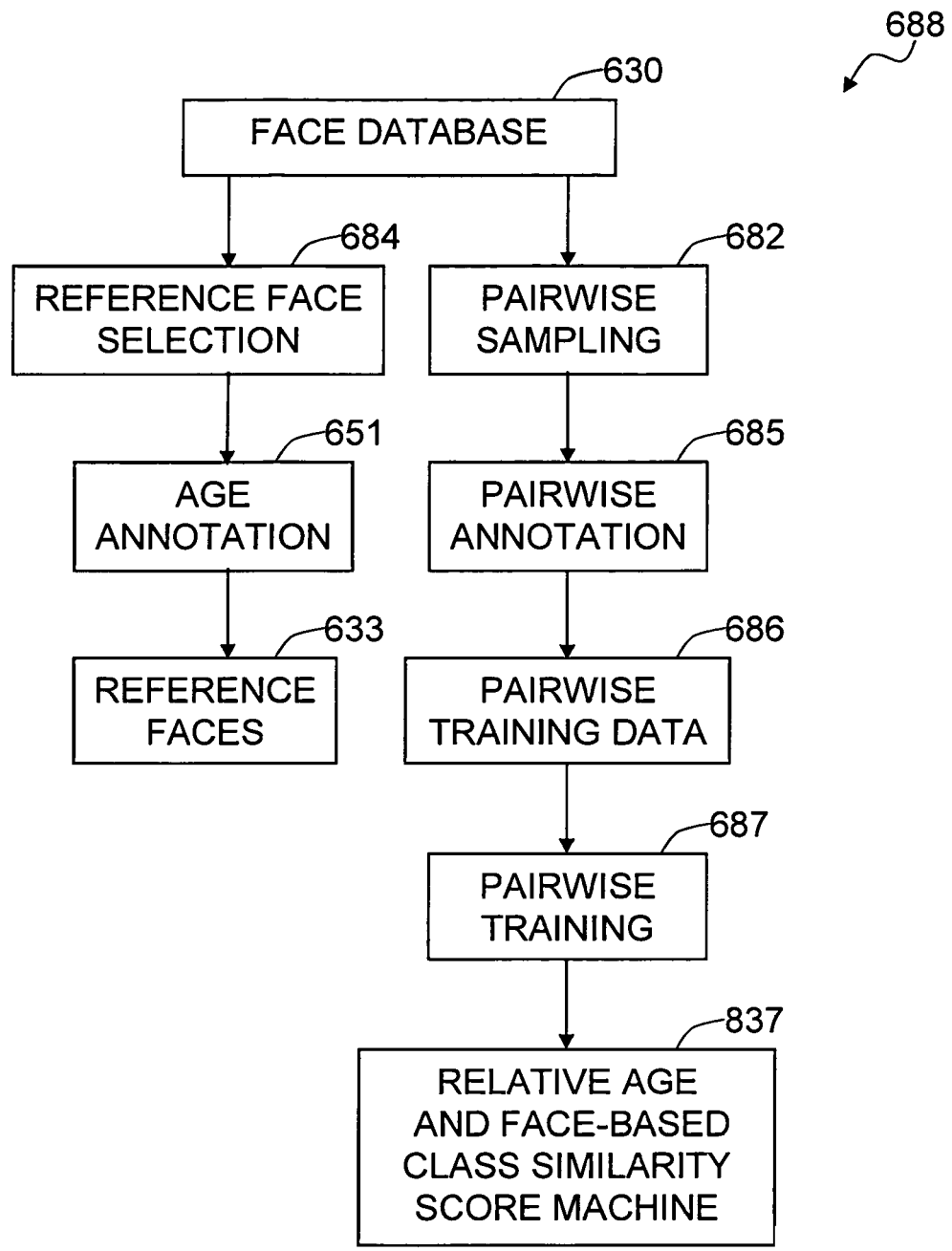
FIG. 2 is a state diagram of the pairwise annotation and training module of the invention.

FIG. 2 illustrates the procedure of pairwise annotation and training 688 step. This step generates both the reference faces 633 and the relative age and face-based class similarity score machine 837. From the face database 630, the reference face selection step 684 chooses faces for which the age can be determined by high confidence. The age annotation 651 assigns the age values to the selected faces, to generate the reference faces 633. In case where ground-truth ages are available, the reference faces are annotated by the ground-truth ages. The reference faces 633 should cover the age range that the system needs to estimate in the end.

The pairwise sampling step 682 samples a pair of faces from the face database 630, and the pairwise annotation 685 step assigns the relative ages and face-based class similarity scores 654 to the pairwise facial images, to generate the pairwise training data 686. The pairwise training step 687 trains the relative age and the face-based class similarity score machine 837 using the pairwise training data 686, so that given any pairwise facial image it can estimate the relative age and the face-based class similarity score 654. The training algorithm for the relative age and face-based class similarity score machine 837 depends on the kind learning machine that the system adopted to use. In an exemplary embodiment, the pairwise training step 687 can comprise a support vector machine training or a standard back-propagation neural network training.

Figure 3:
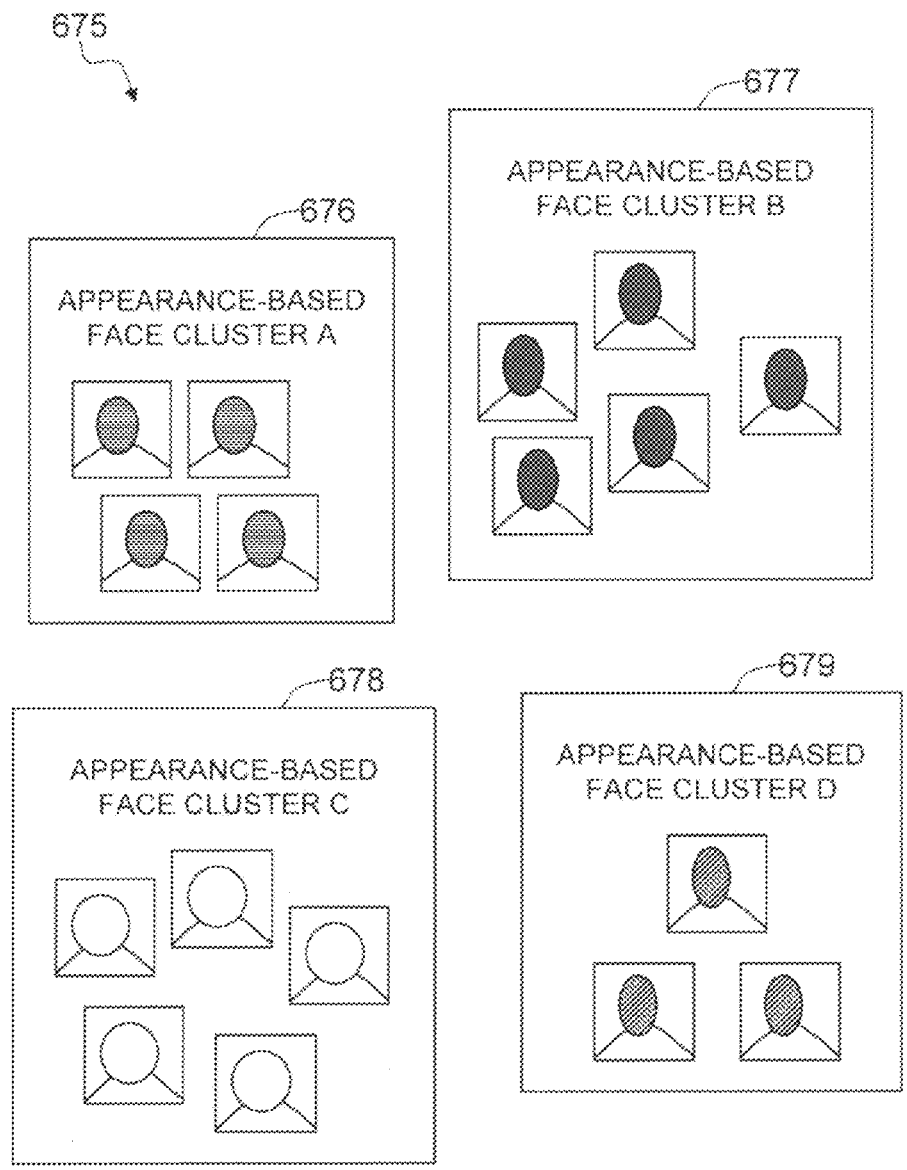
FIG. 3 shows an exemplary embodiment of the face-based classes based on appearance-based face clusters.

FIG. 3 illustrates an exemplary embodiment of the face-based classes. The classes are determined by appearance-based face clusters 675 (appearance-based face cluster A 676 through appearance-based face cluster D 679). In an exemplary embodiment, the appearance-based face clusters 675 can be generated either by an automatic clustering algorithm (such as a nearest-neighbor algorithm, a statistical clustering algorithm, or a graph-based segmentation algorithm) or a manual labeling. The face-based classes helps to improve the age estimation by assigning confidence scores to the relative ages (age comparisons), because age comparisons between similar-looking faces are more reliable.

Figure 4:
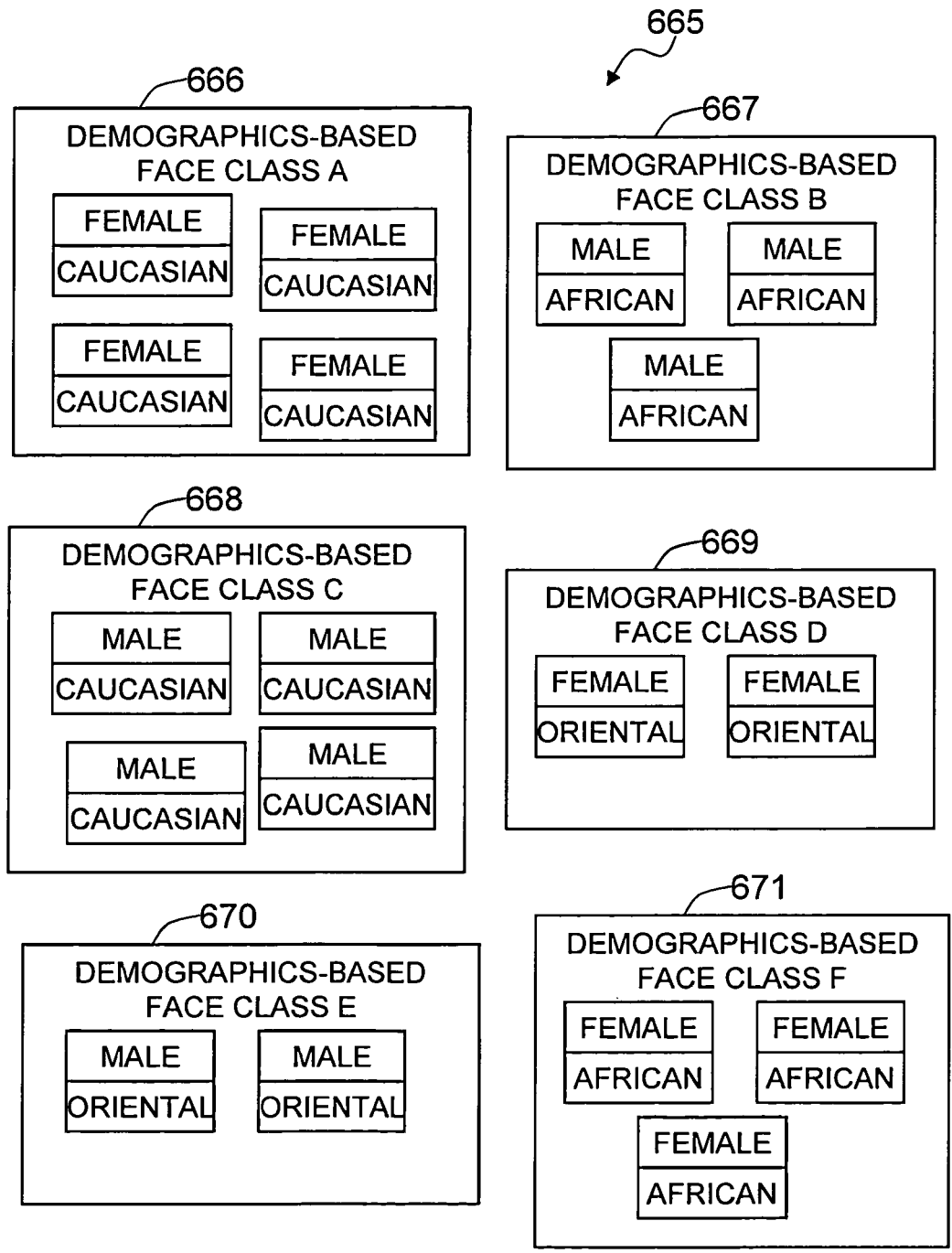
FIG. 4 shows an exemplary embodiment of the face-based classes based on demographics classes.

FIG. 4 illustrates an exemplarity embodiment of the face-based classes. Each demographics-based face classes 665 (demographics-based face class A 666 through demographics-based face class F 671) determines a face-based classes used in the present system. In an exemplary embodiment as shown in FIG. 4, the demographics classes can comprise of gender and ethnicity. The demographics-based class membership also helps to achieve more accurate age estimation, because relative ages (age comparisons) between faces from the same demographics class are more meaningful. The demographics-based face classes 655 can be generated using manual annotation, or using an automated demographics classification algorithm.

Figure 5:
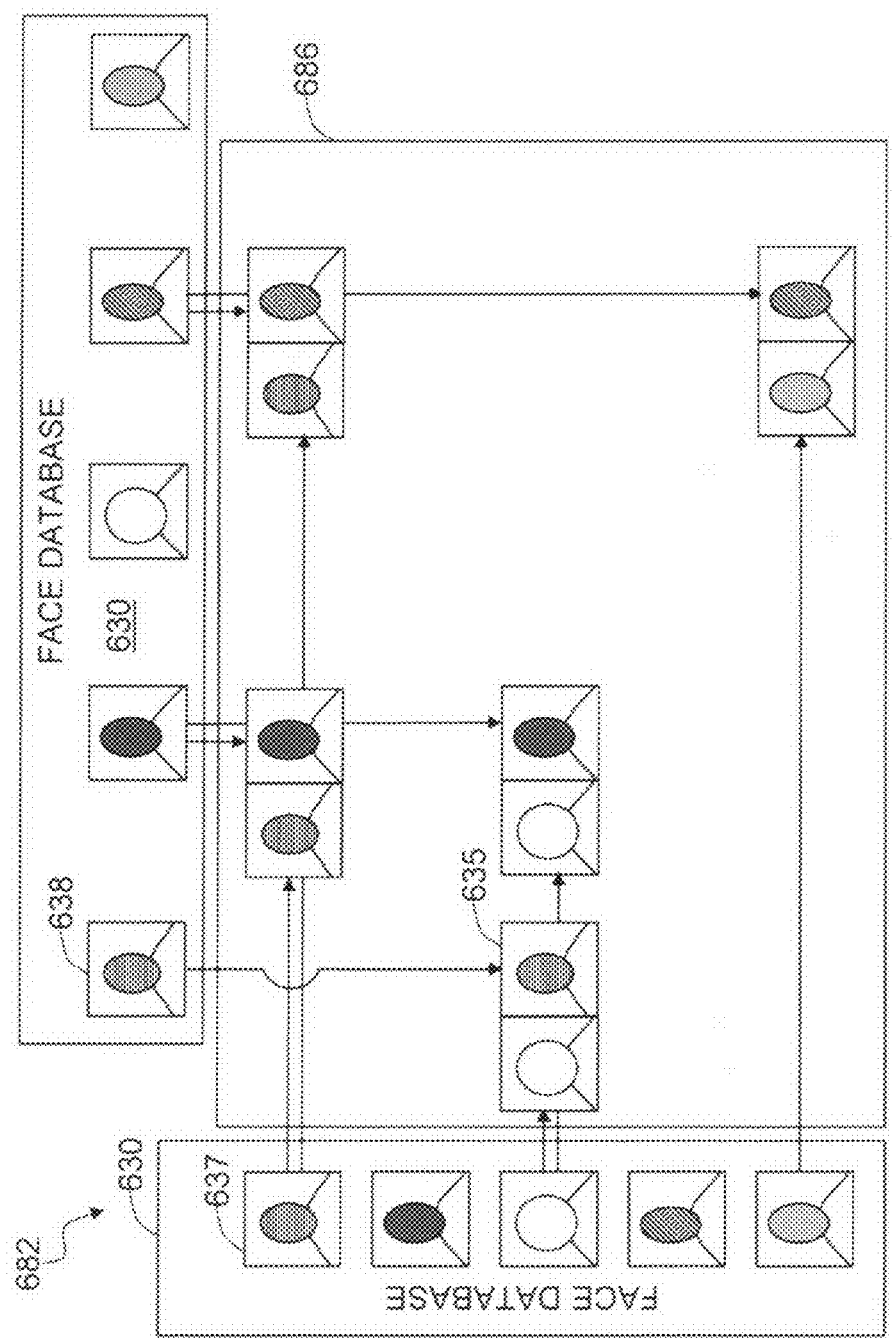
FIG. 5 shows a pairwise sampling scheme in an exemplary embodiment of the present invention.

FIG. 5 illustrates a generic pairwise sampling 682 from the face database 630. Two faces (the first face 637 and the second face 638) from the face database 630 are randomly sampled and paired with each other to produce pairwise facial image 635. Not all the faces in the face database need to be included in the pairwise training data 686. This generic sampling scheme doesn't regard any face-based class information or age information, and the first face and the second face can come from any face-based classes. In an exemplary embodiment, a random number generator algorithm can be used to sample the pairwise facial images 636.

Figure 6:
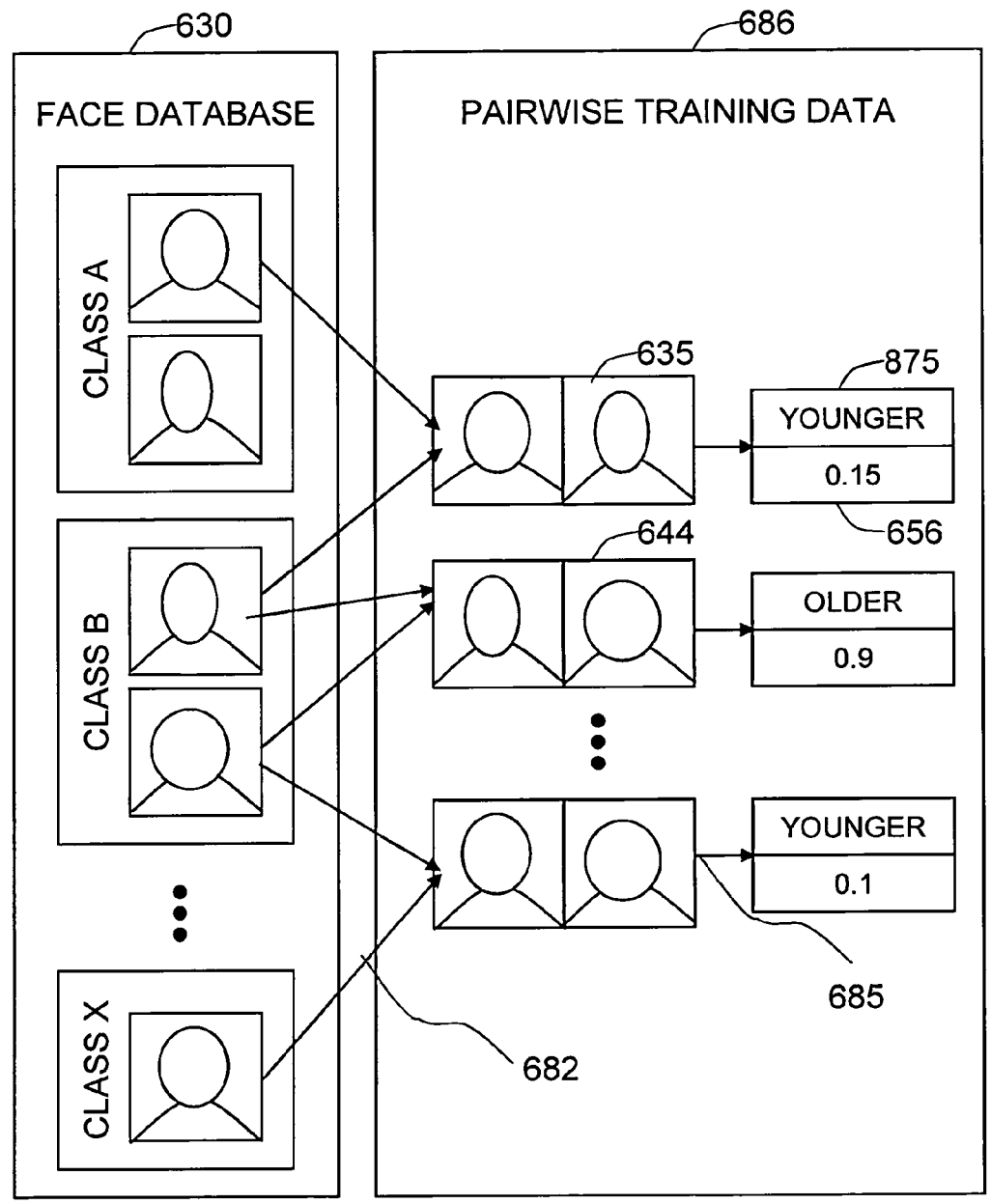
FIG. 6 shows a class-dependent pairwise sampling scheme in an exemplary embodiment of the present invention.

FIG. 6 illustrates an exemplary embodiment of the pairwise sampling 682 from the face database 630 and the pairwise annotation 685 to generate the pairwise training data 686. The sampling doesn't regard the class labels, and samples the pairwise facial images uniformly from the face database 630. Both the relative age 875 and the face-based class similarity scores 656 are determined and annotated. When the faces in the pairwise facial image 635 come from different classes, the face-based class similarity score 656 is 0, or a value close to 0. The two faces from the same class form a same-class pairwise facial image 644, the face-based class similarity score 656 is 1, or a value close to 1.

Figure 7:
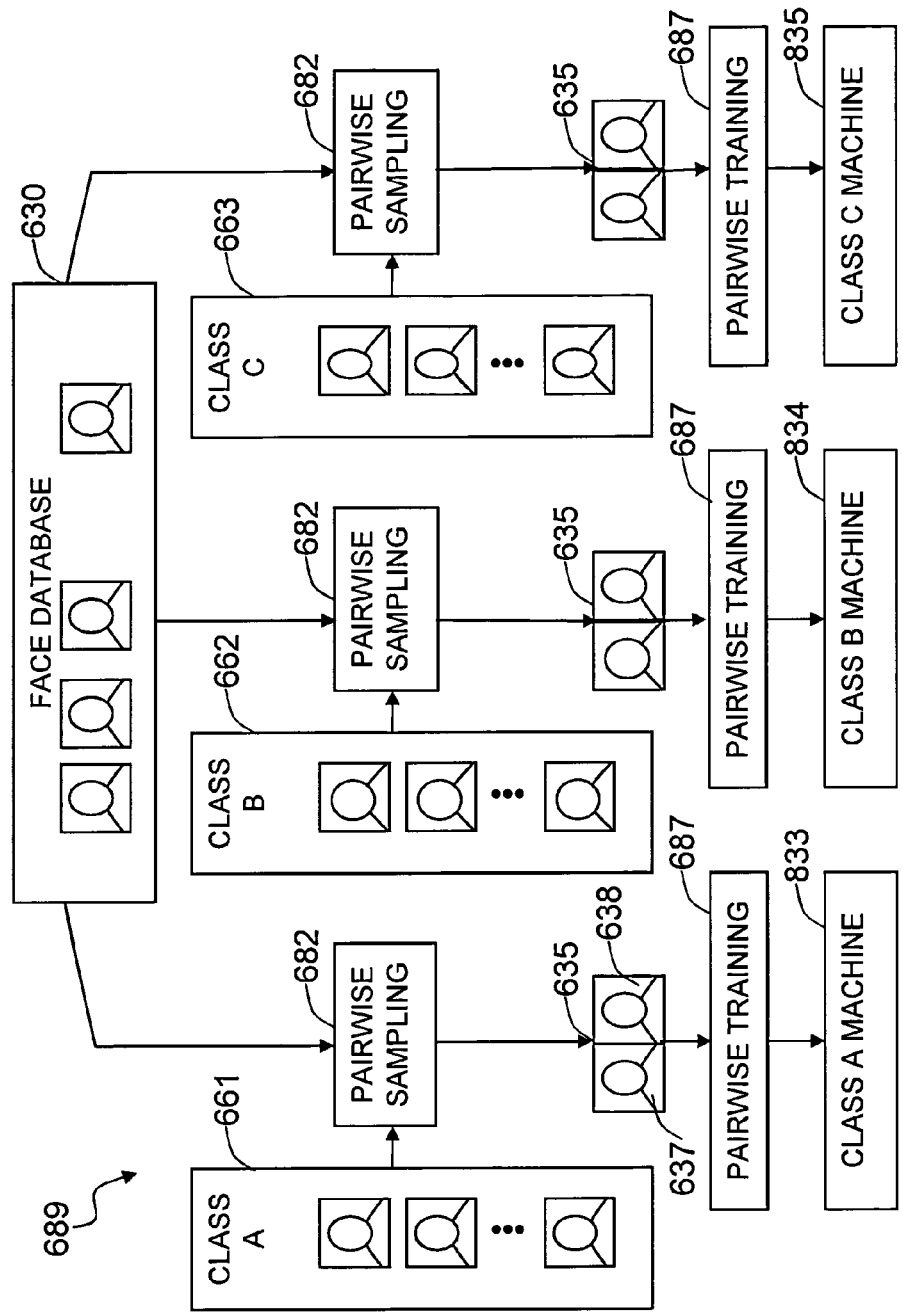
FIG. 7 shows the face-based class-dependent pairwise training scheme in an exemplary embodiment of the present invention.

FIG. 7 illustrates the face-based class-dependent pairwise training 689, which is an exemplary embodiment of the pairwise face training 687.

The class-dependent pairwise sampling 682 pairs faces in face-based class A 661 with faces in face database 630, which contains all the faces from all the classes. The face in face-based class A 661 goes to the first face 637 in the pairwise facial image 635, and the face from the face database 630 goes to the second face 638 in the pairwise facial image 635. Therefore second face 638 in the pair can contain a face from class A or a face from other classes. The pairwise training 687 then produces the class A machine 833, which then takes a pairwise facial image having a first face from class A and the second face from any class. Then given a pairwise facial image 635 whose first face 637 is from the face-based class A 661, the class A machine determines both the face-based class similarity 655 of the second face 638 and the relative age 875 between the faces. The class B machine 834 and the class C machine 835 are trained in the same manner.

In an exemplary embodiment, the class-dependent pairwise training step 689 can comprises a support vector machine training or a standard back-propagation neural network training.

Figure 8:
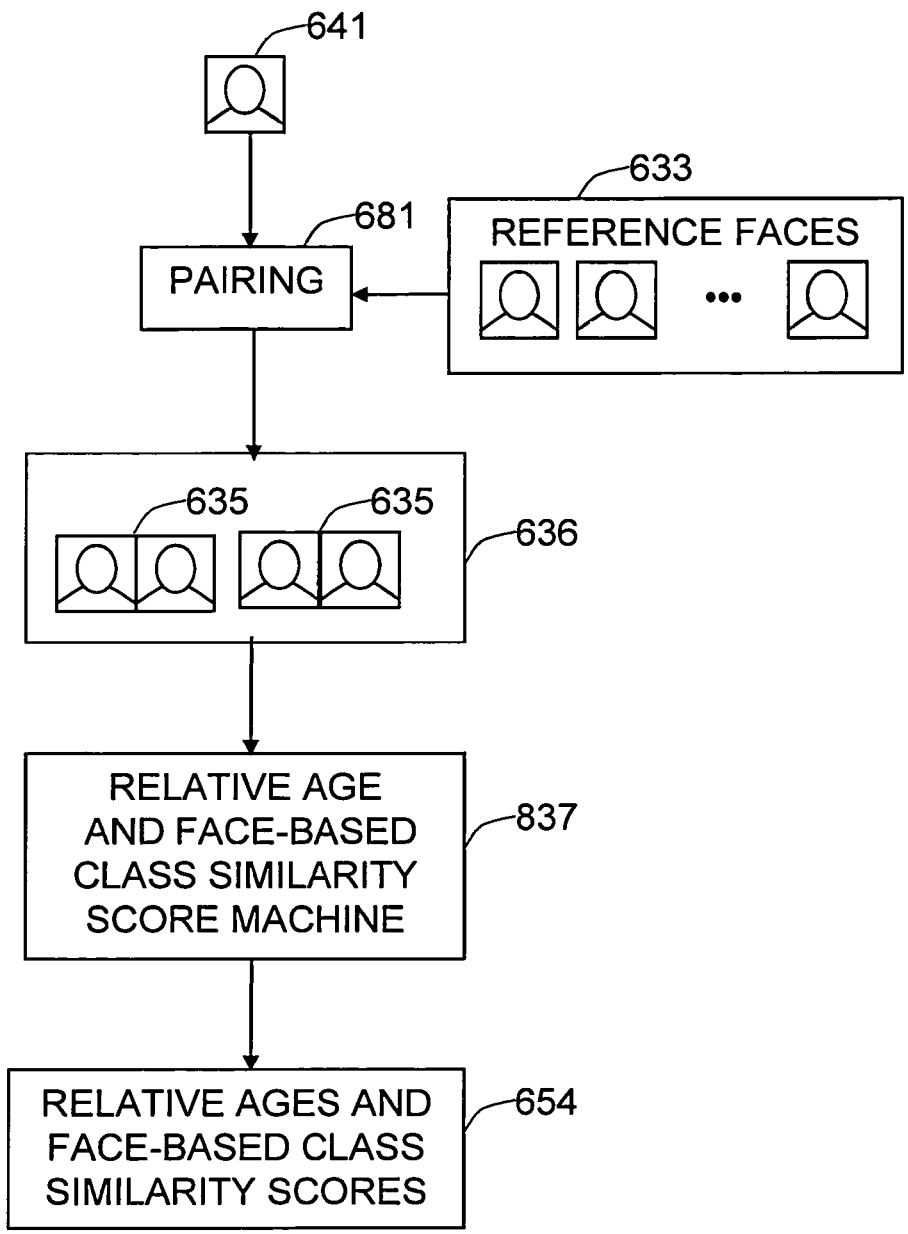
FIG. 8 shows a processing of an input face to estimate its age in an exemplary embodiment of the present invention.

FIG. 8 illustrates an exemplary embodiment of the processing of an input face 641 to estimate its age. The input face 641 is paired with reference faces 633 to form pairwise facial images 636, which are fed to the relative age and face-based class similarity score machine 837. The machine 837 then estimates relative age and face-based class similarity score 654 for each pairwise facial image 635. In the next step, these scores are combined by facial similarity weighted voting 889 to finally compute the estimated age 880.

Figure 9:
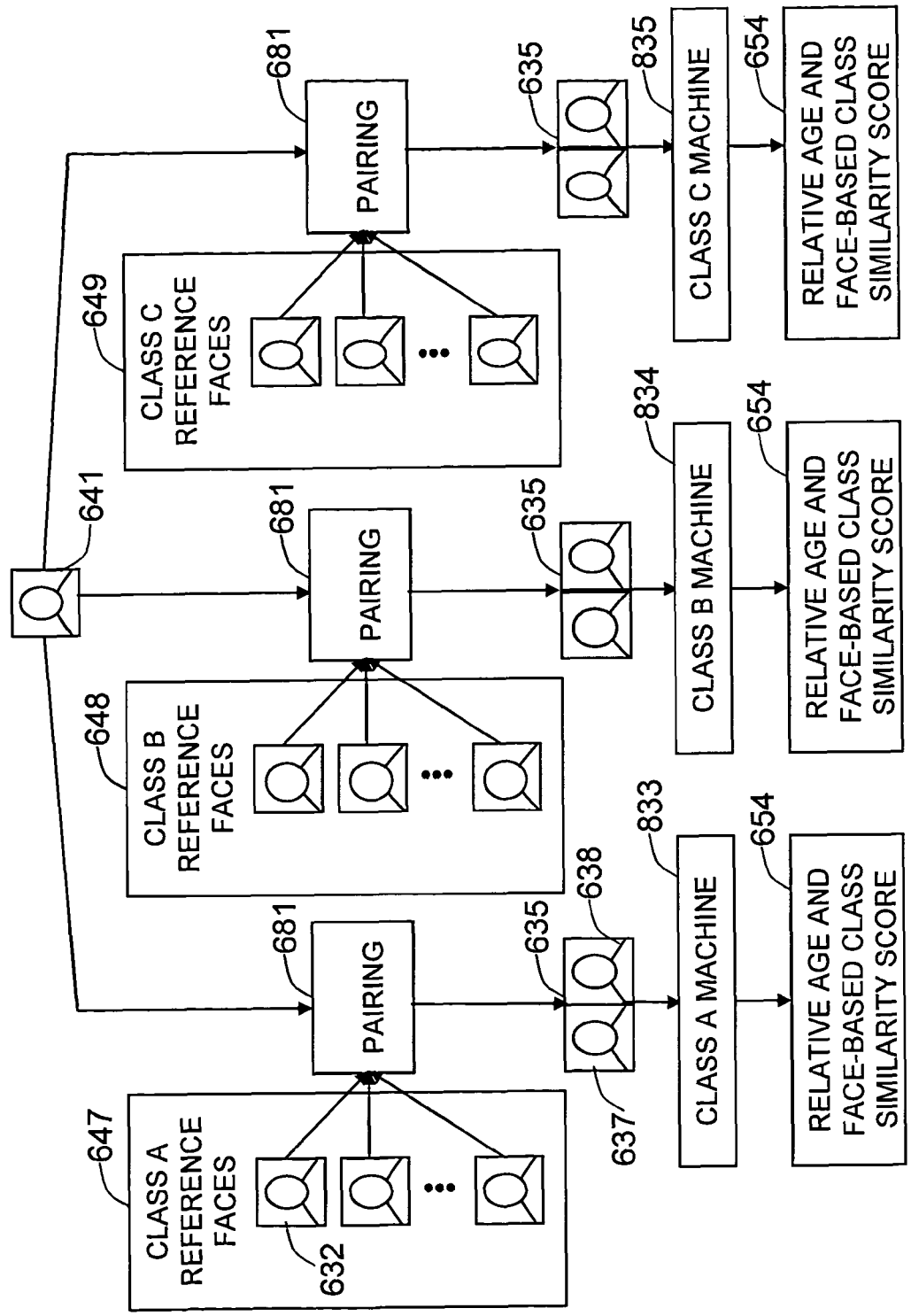
FIG. 9 illustrates a class-dependent processing of an input face to estimate its age in an exemplary embodiment of the present invention.

FIG. 9 illustrates an exemplary embodiment of the class-dependent processing of an input face 641 to compute the relative ages and face-based class-similarity scores 654. The given input face 641 is paired with a number of reference faces 633 from each class (class A reference faces 647 through class-C reference faces 649) to form pairwise facial images 636. The reference face 632 goes to the first face 637 in the pair and the input face 641 goes to the second face 638 in the pair. The pairwise facial image 635 now is fed to class-dependent machines 832 (face-based class A machine 833 through face-based class C machine 835) to compute the relative ages and face-based class-similarity scores 654.

Figure 10:
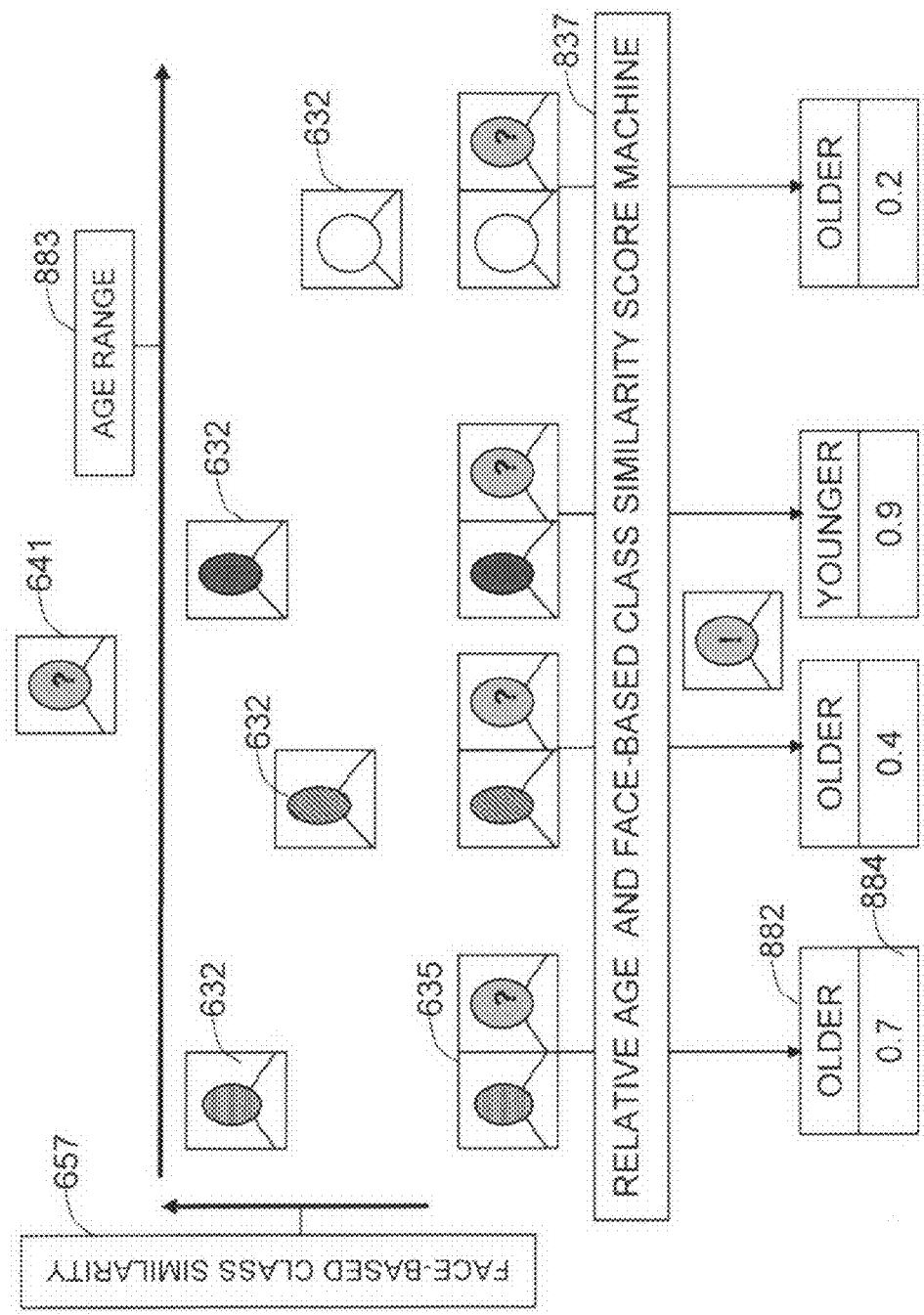
FIG. 10 illustrates the way the given input face is combined with the set of reference faces within range of age and face-based class similarity, to estimate the relative age and the face-based class similarity scores, in an exemplary embodiment of the present invention.

FIG. 10 illustrates the way the given input face 641 is combined with the set of reference faces 633 to form pairwise facial images 636, to estimate the relative ages and the face-based class similarity scores 654 of the pairwise facial images 636. The reference faces 633 uniformly cover the age range 883 and the face-based class similarity range 657, so that the input face 641 having unknown age and face-based class 660 can have comparisons to reference faces having close class similarity. The horizontal position of each reference face 632 in the age range 883 represent the age, and the vertical positions of each reference face 632 in the face-based class similarity range 657 represent the face-based class variety. When the input face 641 is paired with a reference face 632 in the same class, the relative age and face-based class similarity score machine 837 yields high (close to 1) face-based class similarity score 884. When the input face is paired with a reference face 632 from different class, it yields low (close to 0) face-based class similarity score 884.

Figure 11:
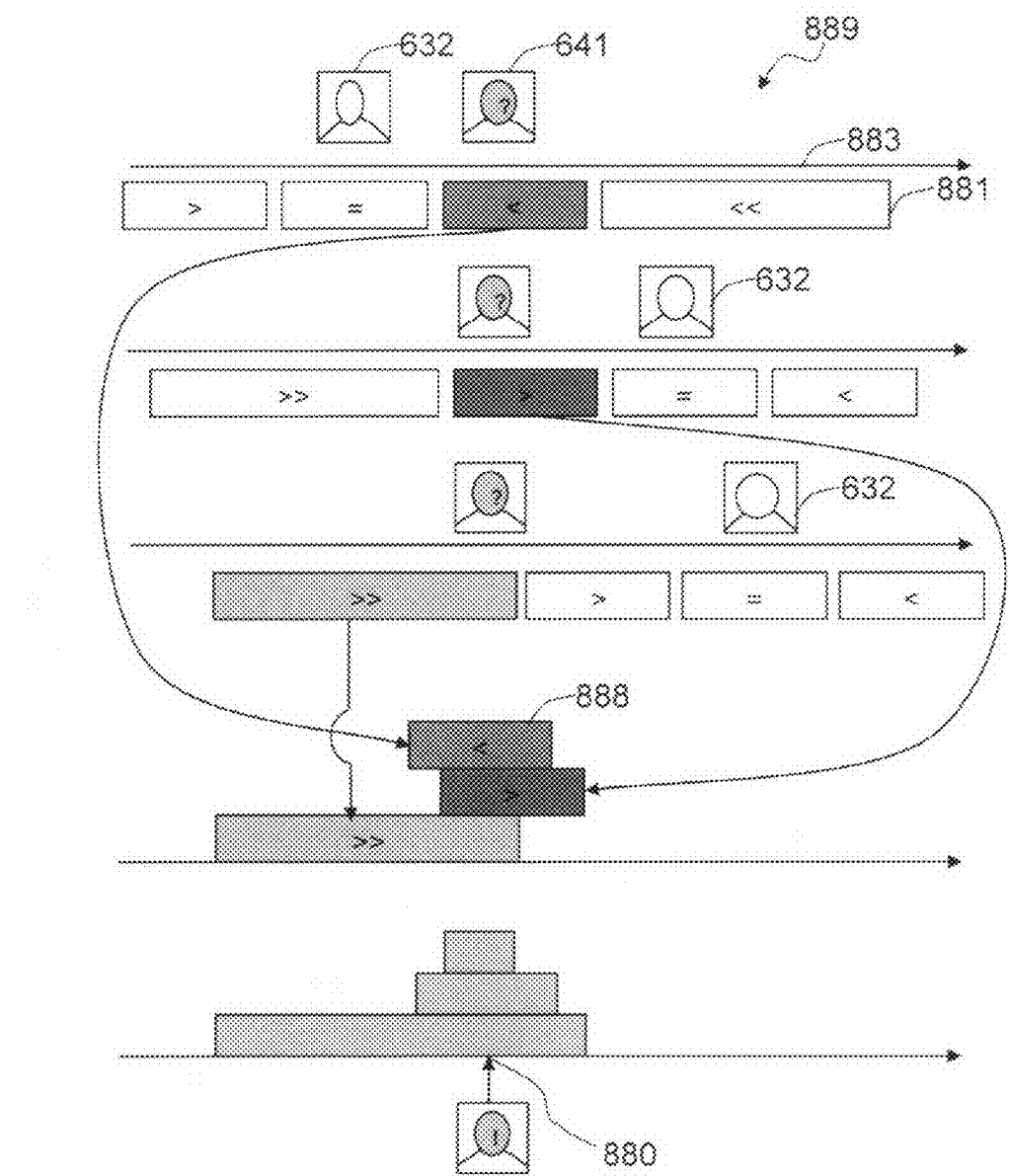
FIG. 11 illustrates the facial similarity weighted voting scheme, in an exemplary embodiment of the present invention.

FIG. 11 illustrates an exemplary embodiment of the facial similarity weighted voting scheme 889. Given a reference face 632, the age range is divided into a plurality of age interval 881 according to the partition of relative age. Input face 641 is paired with each reference face 632, and the relative age and face-based class similarity score machine 837 estimates the relative ages and face-based class similarity scores 654. For each reference face 632, the estimated relative age (of the input face 641 relative to the reference face 632) cast vote to the input face age interval vote 888, with a voting weight given by the face-based class similarity score 656. Then the sum of all votes determines the age of the given input face X.

Rule Application Logic Module

The present invention can utilize a rule application logic module for facilitating the voting process. For example, the partition of relative age into the plurality of divided age intervals can be processed based on a rule in the rule application logic module, which enables the adjustment of the number of partitions and the size of the age intervals in a more structured and dynamic way than an ad-hoc approach. In this exemplary embodiment, the number of partitions and the size of the age intervals can be further dynamically adjusted based on the characteristics of each of the reference faces.

The rule application logic module can also construct a complex criteria for applying the voting weight given by the face-based class similarity score 656 based on a set of predefined rules. For example, in a case when the votes do not converge, such as there exists an outlier vote that is contradictory to other votes or does not intersect with the other votes unlike the exemplary three votes in FIG. 11, one rule in the set of predefined rules can be defined to exclude the outlier vote from the sum of all votes or to give the outlier vote a significantly reduced weight.

The exemplary embodiment can use any reliable rule application logic module implementation for this novel usage. One exemplary prior art for the rule application logic module can be found in U.S. Pat. No. 7,904,477 of Jung, et al., which disclosed a system for processing data and event in an information processing system with verification steps and processing structures based on predefined rules.

Figure 12:
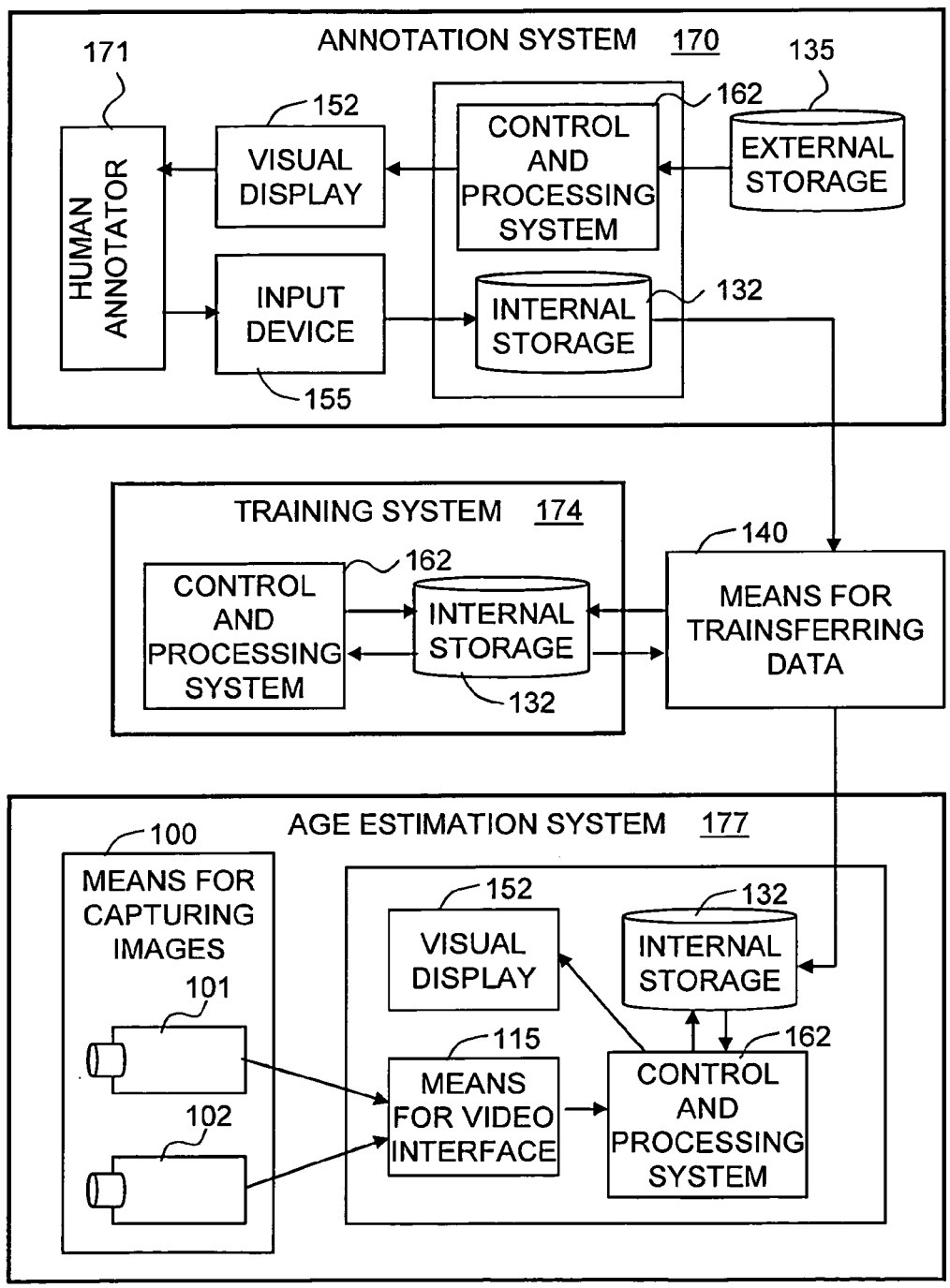
FIG. 12 shows exemplary hardware components in an exemplary embodiment of the present invention.

FIG. 12 shows exemplary hardware components in an exemplary embodiment of the present invention. The hardware components consist of three sub-systems: the annotation system 170, the training system 174, and the age estimation system 177.

In an exemplary embodiment of the present invention, the annotation system 170 comprises a human annotator 171, an external storage 135 with a facial image database, and a computer system that consists of a visual display 152, an input device 155, a control and processing system 162, and an internal storage 132. The external storage 135 can comprise a storage computer server, or an external hard disk. The visual display 152 can comprise a CRT or an LCD monitor. The input device 155 can comprise a keyboard and a mouse. In an exemplary embodiment, a Pentium 4 2.8 GHz PC having 1 GB memory can serve as a control and processing system 162. A generic IDE hard disk drive can serve as the internal storage 132. The control and procesing system 162 samples and fetches a pair of facial images from the external storage 135, and display it to the visual display 152. The human annotator 171 then annotates the pair of facial images based on the displayed images, and records the annotated training data to the internal storage 132 using the input device 155.

In an exemplary embodiment of the present invention, the training system 174 comprises a generic personal computer having a control and processing system 162 and an internal storage 132. A Pentium 4 2.8 GHz PC having 1 GB memory can serve as a control and processing system 162. A generic IDE hard disk drive can serve as the internal storage 132. The annotated training data from the annotation system 170 can be transferred to the internal storage 132 of the training system 174 using means for transferring data 140. The means for transferring data 140 can comprises a direct cable connection, or a network connection. The control and processing system then apply the training algorithm to generate the trained learning machines.

In an exemplary embodiment of the present invention, the age estimation system 177 comprises means for capturing images 100, and a computer system having means for video interface 115, a control and processing system 162, and an internal storage 132. The trained learning machines can be transferred to the internal storage 132 of the age estimation system 177 using means for transferring data 140. The means for capturing images 100 is connected to the means for video interface 115. In the exemplary embodiment, a plurality of means for capturing images 100, the first means for capturing images 101 and the second means for capturing images 102 are connected to the means for video interface 115. The control and processing system 162 takes digitized video data from the means for video interface 115. The control and processing system 162 then process the digitized facial images using the trained learning machines to estimate the age of the facial image. The estimated age can be stored in the internal storage 132, or can be displayed to the visual display 152.

The means for capturing images 100 can comprise an analog camera, USB camera, or Firewire camera. The means for video interface 105, which can comprise a video frame grabber, USB interface, or Firewire interface, are typically included in the same enclosure as the control and processing system 162. The control and processing system 162 can be a general-purpose personal computer, such as a Pentium 4 PC, or a dedicated hardware that can carry out the required computation.

In an exemplary embodiment, a general-purpose USB webcam can serve as the means for capturing images 100. A Pentium 4 2.8 GHz PC having 1 GB memory can serve as a control and processing system 162, where a generic USB interface included in the PC's motherboard can serve as a means for video interface 115. A generic IDE hard disk drive can serve as the internal means for storing data 132.

While the above description contains much specificity, these should not be construed as limitations on the scope of the invention, but as exemplifications of the presently preferred embodiments thereof. Many other ramifications and variations are possible within the teachings of the invention. Thus, the scope of the invention should be determined by the appended claims and their legal equivalents, and not by the examples given.

What is claimed is:

1. A method for automatically performing age estimation based on the facial image of people using the notion of pairwise facial image and relative age, comprising the following steps of:
   a) generating first pairwise facial images along with reference faces from a database of facial images, and annotating the first pairwise facial images for their relative ages and the reference faces for their absolute ages,
   b) determining face-based class similarity for the first pairwise facial images by appearance-based face clusters or demographic categories,
   c) training learning machines using the first pairwise facial images so that the learning machines estimate the relative age and face-based class similarity score of any pairwise facial images,
   d) constructing second pairwise facial images from an input face and the reference faces,
   e) estimating the relative ages of the second pairwise facial images, using the trained learning machines, and
   f) estimating the age of the input face using the relative ages of the second pairwise facial images,
   wherein each of the learning machines represents a face-based class among pre-determined face-based classes,
   wherein first face of each pair in the pairwise facial images belongs to the face-based class, and
   wherein the face-based class similarity represents whether two faces in the pairwise facial images belong to one of predetermined face-based classes.

2. The method according to claim 1, wherein the method further comprises a step of combining the estimated relative ages from the second pairwise facial images to estimate the age of the input face,
   wherein the estimated relative ages are weighted by the face-based class similarity scores.

3. The method according to claim 1, wherein the method further comprises a step of selecting the reference faces for which the ages are determined with high confidence,
   wherein the input face is paired with the reference faces to form the second pairwise facial images.

4. The method according to claim 1, wherein the method further comprises a step of generating class-dependent pairwise facial images,
   wherein the class-dependent pairwise facial images comprise subsets of faces in the database of facial images and each subset represents a pre-determined face-based class.

5. The method according to claim 1, wherein the method further comprises a step of pairing the input face with the references faces in each face-based class of the pre-determined face-based classes to form the second pairwise facial images, wherein first face in a pairwise facial image is a reference face from the given face-based class and second face is the input face.

6. The method according to claim 1, wherein the method further comprises a step of estimating the relative age of each of the second pairwise facial images using the learning machines that are class-dependent, wherein the estimated relative age casts vote to an input face age interval vote for each reference face, with a voting weight given by face-based class similarity score.

7. An apparatus for automatically performing age estimation based on the facial image of people using the notion of pairwise facial image and relative age, comprising:
   a) means for generating first pairwise facial images along with reference faces from a database of facial images, and annotating the first pairwise facial images for their relative ages and the reference faces for their absolute ages, b) means for determining face-based class similarity for the first pairwise facial images by appearance-based face clusters or demographic categories, c) means for training learning machines using the first pairwise facial images so that the learning machines estimate the relative age and face-based class similarity score of any pairwise facial images, d) means for constructing second pairwise facial images from an input face and the reference faces, e) means for estimating the relative ages of second pairwise facial images, using the trained learning machines, and f) means for estimating the age of the input face using the relative ages of the second pairwise facial images, wherein each of the learning machines represents a face-based class among pre-determined face-based classes, wherein first face of each pair in the pairwise facial images belongs to the face-based class, and wherein the face-based class similarity represents whether two faces in the pairwise facial images belong to one of predetermined face-based classes.

8. The apparatus according to claim 7, wherein the apparatus further comprises means for combining the estimated relative ages from the second pairwise facial images to estimate the age of the input face, wherein the estimated relative ages are weighted by the face-based class similarity scores.

9. The apparatus according to claim 7, wherein the apparatus further comprises means for selecting the reference faces for which the ages are determined with high confidence, wherein the input face is paired with the reference faces to form the second pairwise facial images.

10. The apparatus according to claim 7, wherein the apparatus further comprises means for generating class-dependent pairwise facial images, wherein the class-dependent pairwise facial images comprise subsets of faces in the database of facial images and each subset represents a pre-determined face-based class.

11. The apparatus according to claim 7, wherein the apparatus further comprises means for pairing the input face with the references faces in each face-based class of the pre-determined face-based classes to form the second pairwise facial images, wherein first face in a pairwise facial image is a reference face from the given face-based class and second face is the input face.

12. The apparatus according to claim 7, wherein the apparatus further comprises means for estimating the relative age of each of the second pairwise facial images using the learning machines that are class-dependent, wherein the estimated relative age casts vote to an input face age interval vote for each reference face, with a voting weight given by face-based class similarity score.

* * * * *